(No Model.)
J. D. CHEEVER.
APPARATUS FOR APPLYING SOLUTIONS OF CHLORIDE OF SULPHUR IN BISULPHIDE OF CARBON TO SHEETS OF PLASTIC COMPOUNDS.
No. 254,464. Patented Mar. 7, 1882.
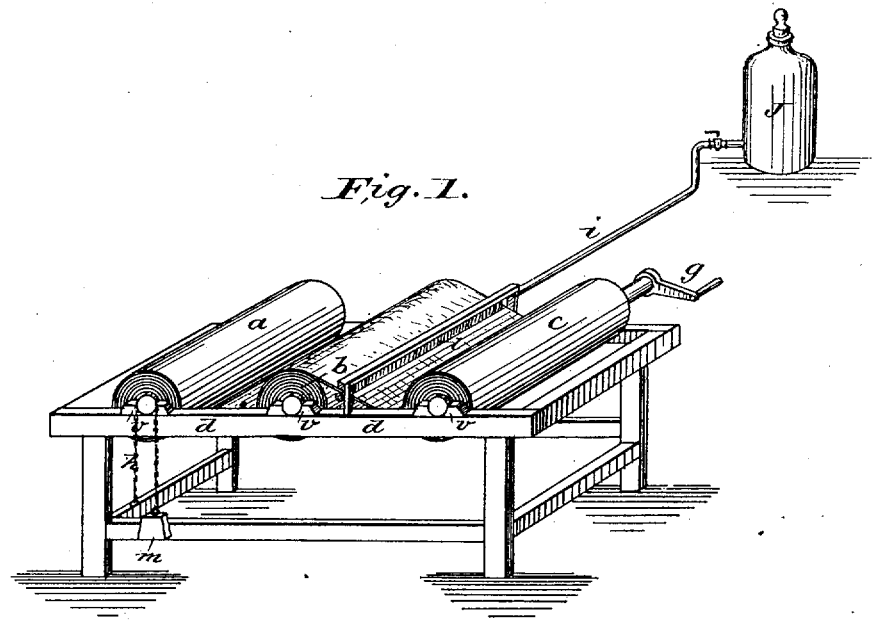
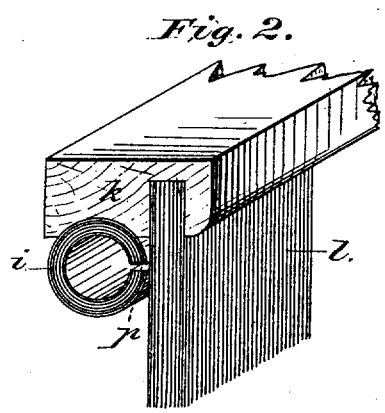
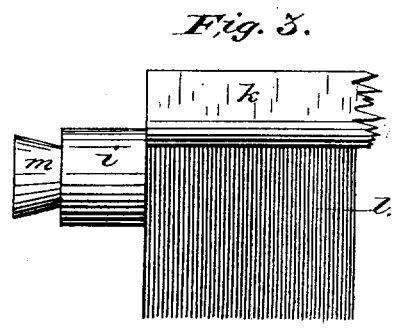
WITNESSES
INVENTOR
John D. Cheever

UNITED STATES PATENT OFFICE.

JOHN D. CHEEVER, OF NEW YORK, N. Y.

APPARATUS FOR APPLYING SOLUTIONS OF CHLORIDE OF SULPHUR IN BISULPHIDE OF CARBON TO SHEETS OF PLASTIC COMPOUNDS.

SPECIFICATION forming part of Letters Patent No. 254,464, dated March 7, 1882.

Application filed January 24, 1882. (No model.)

*To all whom it may concern:*

Be it known that I, JOHN D. CHEEVER, a citizen of the United States, residing at New York, in the county of New York and State of New York, have invented certain new and useful Improvements in Apparatus for Applying Solutions of Chloride of Sulphur in Bisulphide of Carbon to Sheets of Plastic Compounds or Compositions; and I do hereby declare the following to be a full, clear, and exact description of the invention, such as will enable others skilled in the art to which it appertains to make and use the same, reference being had to the accompanying drawings, and to the letters of reference marked thereon, which form a part of this specification, in which—

Figure 1 is an isometrical perspective of the whole apparatus. Fig. 2 is an end view of the pipe leading from the reservoir of liquid to and immediately over the sheet to be treated, with the brush attachment for uniformly distributing the fluid. Fig. 3 is a side or longitudinal view of Fig. 2.

In constructing the apparatus a frame is made, as shown in Fig. 1, *d d*. On each side of the frame are fastened three boxes or rests for the journals of three rollers, as shown at *v v v*. Three cylinders, *a b c*, are next made of the required length, corresponding with the width of the sheets to be treated, with journals to rest in the boxes above referred to. A cord or belt, *h*, one end of which is attached to the frame and the other to a weight, passes over the journal of cylinder *a*, for regulating, by friction, as a brake, its ease of motion. The cloth or sheet to be treated is wound on this cylinder, and passed over cylinder *b* to cylinder *c*, as shown in the drawings, to which it is attached. A crank, *g*, is attached to *c*, which enables the operator to draw the cloth from *a* over *b* and wind it on *c*, the brake *h* regulating uniformly the tension of the sheet.

Over the sheet or cloth, between cylinders *b* and *c*, a pipe for supplying the liquid is adjusted, as shown at *i*, Fig. 1, leading from a reservoir, J, placed at an elevation of a few inches above the cylinders. At K is placed a cock for regulating the flow of the liquid. The pipe is perforated at short intervals of space through a length, according to the width of the sheet to be treated. On the pipe rests a brush, as shown in Fig. 2, of which *k* is the wood or other suitable material for holding the bristles or fibers *l*, which are fastened in the wood in the manner commonly practiced in making brushes, or cemented by a suitable cement.

In practice the liquid is poured into the jar J, the sheet is adjusted, as above described, a cork, *m*, Fig. 3, is put into the end of the pipe, and the cock is opened while the cloth is drawn under the brush, which is continuously saturated with liquid escaping through the apertures *p*, Fig. 2, and wound on cylinder *c*. The cock is finally closed, the cork *m* removed, and the liquid returned to the reservoir J. The reservoir is best made of glass. The pipe is also best when made of glass; but it may be made of lead or other suitable metal.

The brush may be made of any suitable fibers; but I prefer bristles, such as are ordinarily used for brushes. Felt of wood or fur also answers the purpose very well.

Among the advantages gained by the use of my apparatus are a uniform treatment of every part of the sheet throughout its whole length, which cannot be accomplished with a hand-brush; the rapidity of the application of the liquid, and consequent saving of it; and the immediate inclosure of the liquid within the folds of the sheet, where it effects the chemical change required of it.

Having thus described my invention, what I claim, and desire to secure by Letters Patent, is—

1. The apparatus for applying uniformly without waste solutions of chloride of sulphur in carbon disulphide and other liquids to sheets formed of plastic materials and to cloth, consisting of a roll to hold the fabric to be coated, a supporting roll, and a liquid-distributing pipe, constructed substantially as described.

2. In a machine for coating fabrics with volatile liquids, a brush of bristles, fibers, felt, or cloth, with a tube or channel connected with a reservoir for holding liquids, having small apertures for supplying fluids to the brush, substantially as described, and for the purposes set forth.

3. The combination, in a machine for coating fabrics with materials in volatile solvents, of the rollers $a$, $b$, and $c$ with a pipe, $i$, provided with a brush, all substantially as set forth.

In testimony whereof I affix my signature in presence of two witnesses.

JOHN D. CHEEVER.

Witnesses:
 VICTOR E. BURKE,
 ALFRED R. PAGE.